United States Patent
Yoon

(10) Patent No.: US 6,406,190 B1
(45) Date of Patent: Jun. 18, 2002

(54) JOINT TYPE DISC CAGE OF ROLLER BEARING

(76) Inventor: Suk Tae Yoon, 337-1, Shinsa-dong, Eunpyung-ku, Seoul (KR), 122-080

( * ) Notice: Subject to any disclaimer, the term of this patent is extended or adjusted under 35 U.S.C. 154(b) by 0 days.

(21) Appl. No.: 09/661,157

(22) Filed: Sep. 13, 2000

(30) Foreign Application Priority Data

Nov. 16, 1999 (KR) .............................................. 99-25171

(51) Int. Cl.$^7$ .............................................. F16C 33/46
(52) U.S. Cl. ....................... 384/572; 384/551; 384/577
(58) Field of Search ................................ 384/572, 573, 384/575, 577, 578, 579, 570, 551, 520, 523

(56) References Cited

U.S. PATENT DOCUMENTS

| | | | | |
|---|---|---|---|---|
| 242,290 | A | * 5/1881 | Ferrall | 384/551 |
| 586,535 | A | * 7/1897 | Vinton | 384/551 |
| 598,197 | A | * 2/1898 | Diebel | 384/532 |
| 2,016,526 | A | * 10/1935 | Tyson | 384/565 |
| 2,365,154 | A | * 12/1944 | Storz | 384/570 |
| 3,399,008 | A | * 8/1968 | Farrell et al. | 384/577 |
| 3,866,989 | A | 2/1975 | Potter | 384/538 |
| 3,980,359 | A | * 9/1976 | Wetherbee, Jr. | 384/572 X |
| 4,472,007 | A | * 9/1984 | De Vito | 384/572 |
| 5,433,535 | A | 7/1995 | Hah | 384/564 |
| 6,019,518 | A | 2/2000 | Yoon | 384/560 |

FOREIGN PATENT DOCUMENTS

| | | | |
|---|---|---|---|
| JP | 4-357326 A | 10/1992 | |
| WO | WO-93/24759 | * 12/1993 | 384/572 |

* cited by examiner

*Primary Examiner*—Thomas R. Hannon
(74) *Attorney, Agent, or Firm*—James Creighton Wray; Meera P. Narasimhan

(57) ABSTRACT

A joint type disc cage of a roller bearing in which a joint is provided at a sheared part of the disc cage so as to fit it into a single-pieced outer or inner race of the roller bearing. Owing to the joint structure of the sheared part of the disc cage, the installation of the disc cage can be easily carried out, and the installed disc cage is maintained in a circular form, so that the function of the disc cage becomes superior, and deformations, abrasions and degradations of the disc cage can be prevented, as well as ensuring the durability and safety of the roller bearing. The disc cage 1 is sheared at one place to form a sheared part 2 which forms two joint end portions 2a and 2b, so as to install the disc cage 1 into an annular installing groove 5 of the outer or inner race 4 and 4a of the roller bearing. The joint end portions 2a and 2b of the sheared part 2 are firmly engagedly coupled together, and therefore, actually the disc cage 1 performs like a non-sheared disc cage.

4 Claims, 8 Drawing Sheets

JOINT TYPE DISC CAGE OF ROLLER BEARING

BACKGROUND OF THE INVENTION

1. Field of the Invention

The present invention relates to a joint type disc cage of a roller bearing, in which a joint means is provided at a sheared part of the disc cage so as to fit it into a single-pieced outer or inner race of the roller bearing.

2. Description of the Prior Art

In the conventional roller bearings, the rollers are arranged at uniform intervals, and in order to improve the rolling action of them, a disc cage with a plurality of roller accommodating slots formed therein is installed on the outer or inner race of the roller bearing.

In the case where the inner or outer race of the roller bearing is divided into two pieces, a circular disc cage which has no sheared part but is continuous is installed.

However, if the inner or outer race of the roller bearing is completely circular without a sheared part, then the disc cage cannot be installed into a installing groove of the inner or outer race.

Therefore, in this case, the disc cage is sheared in the radial direction into two pieces, and then, the two pieces of the disc cage are assembled to the inner or outer race of the roller bearing.

Alternatively, the disc cage is sheared into a C shape, and the sheared part is spread to expand the inside diameter of the disc cage so as to assemble the disc cage into the installing groove of the inner race of the roller bearing, or vice versa. This prior art was patented by the present inventor under the Korean Utility Model Registration No. 158987 (dated Jul. 20, 1999) and No. 158988 (dated Jul. 20, 1999).

In this disc cage, in order to install a single-pieced disc cage into the installing groove of a single-pieced inner or outer race of the roller bearing, a circular disc cage is sheared into a C shape. Thus if the C shaped disc cage is to be installed into the installing groove of a single-pieced outer race, the disc cage is compressed to reduce the outside diameter of the disc cage, thereby inserting the compressed disc cage into the installing groove of the outer race. On the other hand, if the C shaped disc cage is to be installed into the annular installing groove of a single-pieced inner race, then the C shaped disc cage is spread to expand the inside diameter of the disc cage, thereby inserting the disc cage into the annular installing groove of the inner race of the roller bearing.

Once being installed, the compressed or spread disc cage is restored to the circular shape owing to the self elasticity of the disc cage. In this case, a small gap remains at the sheared part of the disc cage.

Under this condition, the ends of the sheared part of the disc cage are facing toward each other, but there is no mutual engagement. Therefore, when the rollers of the roller bearing revolve at a high speed under a heavy load of the shaft, the ends of the sheared part of the disc cage collide together due to external pressures or impacts, or the disc cage generates severe friction-vibrations. Therefore, the end portions of the sheared part of the disc cage are materially degraded or deformed. Consequently, the end portions of the sheared part of the disc cage undergo corrosions and abrasions, with the result that the performance and the stability of the disc cage are deteriorated.

SUMMARY OF THE INVENTION

The present invention is intended to overcome the above described disadvantages of the conventional techniques.

Therefore, it is an object of the present invention to provide a joint type disc cage of a roller bearing, in which a joint means is provided on the sheared end portions of the disc cage, thereby making it possible to maintain the characteristics of the non-sheared disc cage.

It is another object of the present invention to provide a joint type disc cage of a roller bearing, in which owing to the joint structure of the sheared part of the disc cage, the installation of the disc cage can be easily carried out, and the installed disc cage is maintained in a circular form, so that the function of the disc cage becomes superior, and deformations, abrasions and degradations of the disc cage can be prevented, as well as ensuring the durability and safety of the roller bearing.

In achieving the above objects, the joint type disc cage of a roller bearing, the disc cage being circular and being sheared so as to install it into an annular installing groove of an inner or outer race of the roller bearing according to the present invention includes: joint end portions $2a$ and $2b$ (of a sheared part $2$ of the disc cage) having a function of a joint to be firmly engaged together without being loosely moved to left or right or in a radial direction.

That is, in order to install a circular disc cage into an annular installing groove of a single-pieced inner or outer race of a roller bearing, the disc cage is sheared into a C shape. However, unlike the conventional sheared disc cage in which there is formed a small gap in the angular direction, the sheared part of the disc cage of the present invention is engagedly coupled to form a joint. In other words, the disc cage is sheared by a press-blanking, and the sheared line is curved without leaving any gap as if two hands are grasping together, thereby forming a joint type disc cage.

There are available various asymmetric joint contours such as a J type joint, an N type joint, a Q type joint and other geometric puzzle joints.

The joint type disc cage of the present invention is sheared at one place, and therefore, when it is to be installed into an annular installing groove of an outer race, the outside diameter of the disc cage is reduced by compressing the disc cage to install it into the annular installing groove. On the other hand, when the disc cage is to be installed into an annular installing groove of an inner race, the sheared disc cage is spread to expand the inside diameter of the disc cage to install it into the annular installing groove of the inner race.

After fitting the disc cage into the annular installing groove, a slight external force is applied to the joint end portions of the disc cage to engagedly couple the end portions of the disc cage, thereby making the installed disc cage completely circular. In this manner, the sheared disc cage is restored to the perfectly circular contour which had been maintained before shearing it. Thus when the roller bearing revolves under a heavy load, there exists no gap at the sheared part of the disc cage, but the sheared end portions are firmly engagedly coupled together, and therefore, any loose movements do not occur in the lateral or radial direction.

Therefore, there will be no apprehension that corrosion, deformation, abrasion and degradation may occur. Further, the disc cage can perfectly carry out the function of maintaining the rollers at uniform intervals, and the function of lubricating the rollers. Further, the durability and safety of the roller bearing can be improved.

BRIEF DESCRIPTION OF THE DRAWINGS

The above objects and other advantages of the present invention will become more apparent by describing in detail the preferred embodiment of the present invention with reference to the attached drawings in which.

DETAILED DESCRIPTION OF THE PREFERRED EMBODIMENTS

Examples of the present invention will be described referring to the attached drawings.

EXAMPLE 1

Figure 1:
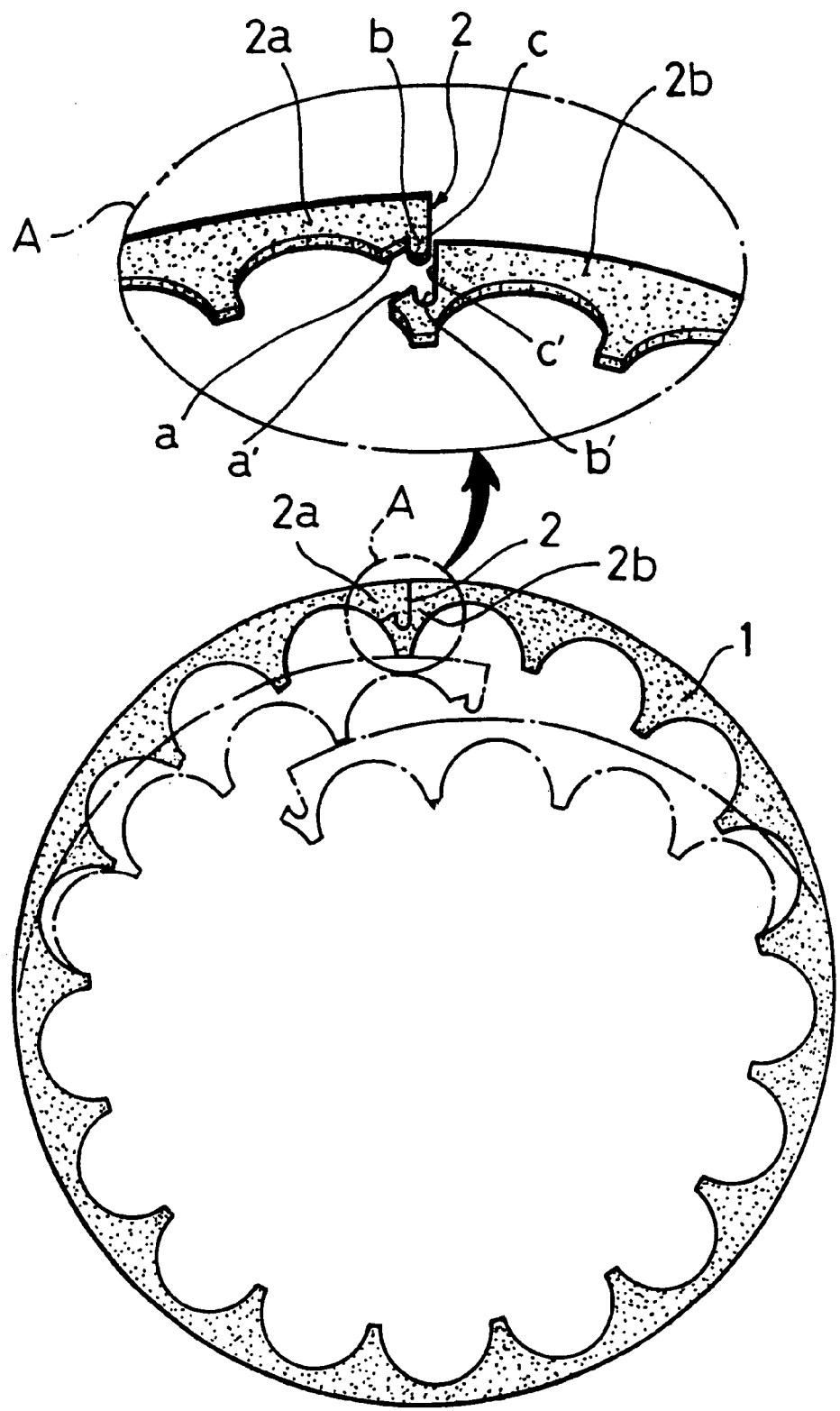
FIG. 1 is a side view of the J joint type disc cage to be installed on an outer race according to the present invention.
Figure 2:
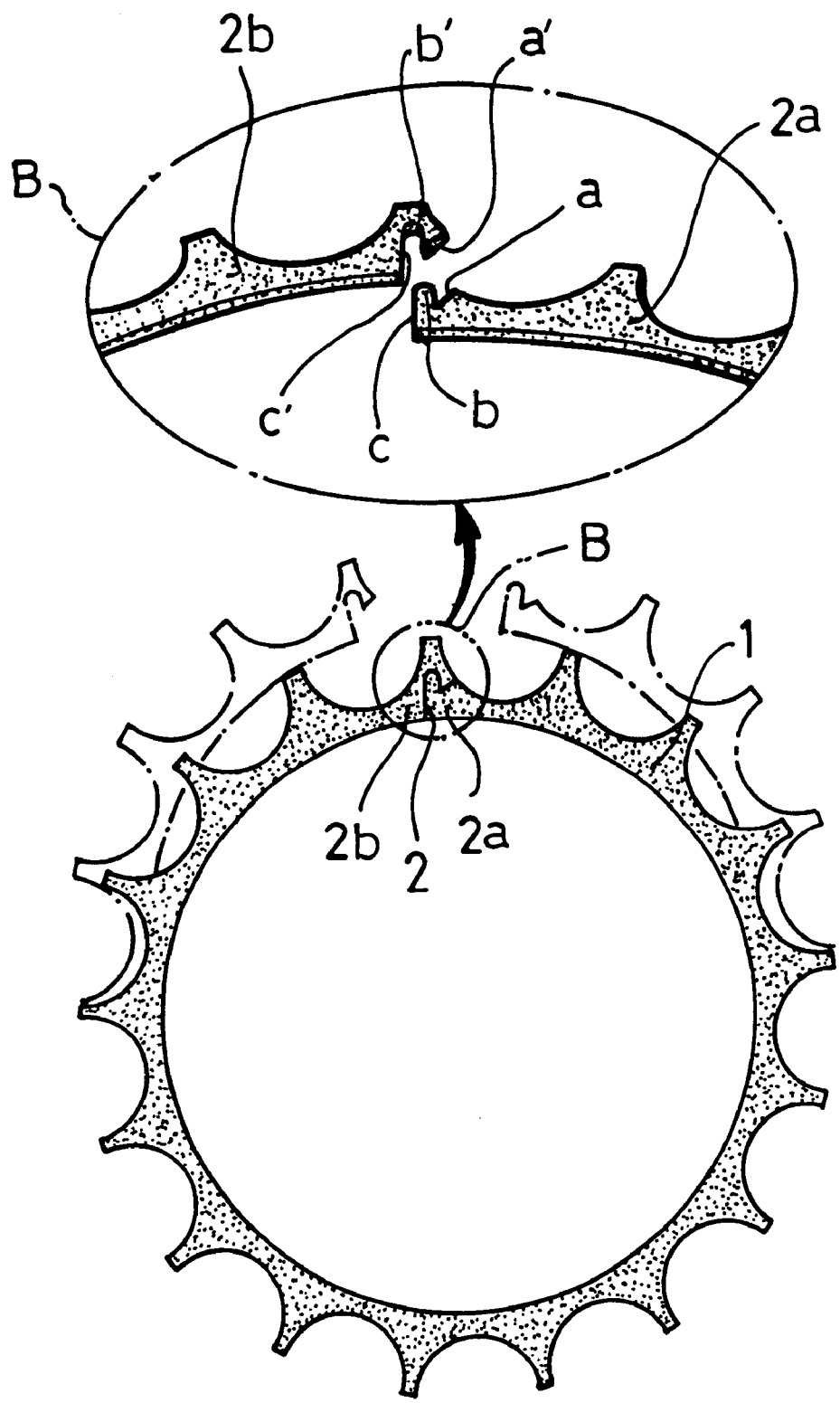
FIG. 2 is a side view of the J joint type disc cage to be installed on an inner race according to the present invention.

FIGS. 1 and 2 are side views of the J joint type disc cage according to the present invention.

In order to install a circular disc cage 1 into an annular installing groove 5 of a single-pieced inner or outer race 4a or 4 of a roller bearing 3, the disc cage 1 is sheared into a C shape. Thus the disc cage 1 is made to have a sheared part 2, and a joint end portion 2a has an inclined part a, a projected part b and a vertical part c, while another joint end portion 2b of the disc cage 1 has an inclined part a', a recessed part b' and a vertical part c', thereby forming a J joint type structure.

The size of the disc cage and the number of the roller accommodating slots of the disc cage are not the critical features of the present invention, and therefore, the descriptions on them will be skipped.

Figure 7:
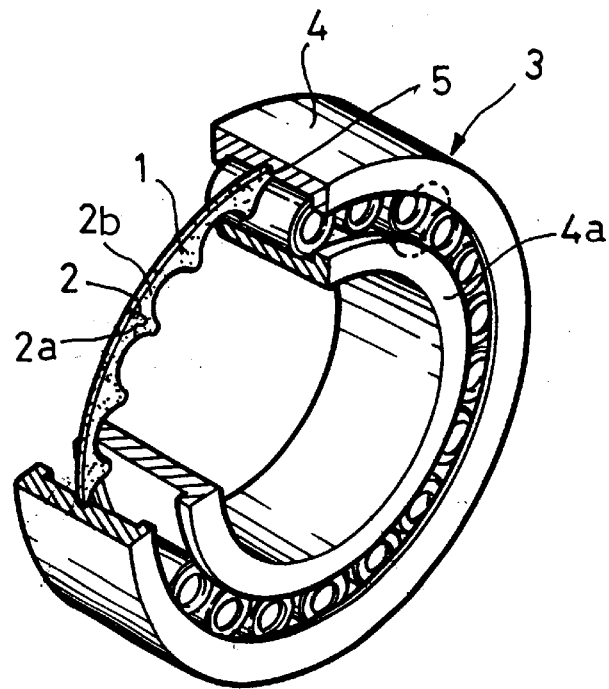
FIG. 7 illustrates the joint type disc cage which has been installed on the outer race according to the present invention.

As shown in FIG. 7, when this J joint type disc cage 1 is installed into an annular installing groove 5 of a single-pieced outer race 4 of a roller bearing 3, the disc cage 1 is compressed by slightly deflecting the both joint end portions 2a and 2b to reduce the outside diameter of the disc cage 1. Then the disc cage thus compressed is fitted into the annular installing groove 5 of the outer race 4, and then, the joint end portions 2a and 2b are engagedly coupled together. In this manner, the projected part b is inserted into the recessed part b', and the inclined parts a and a' and the vertical parts c and c' are closely contacted together. Thus the disc cage 1 becomes like a non-sheared structure.

Figure 8:
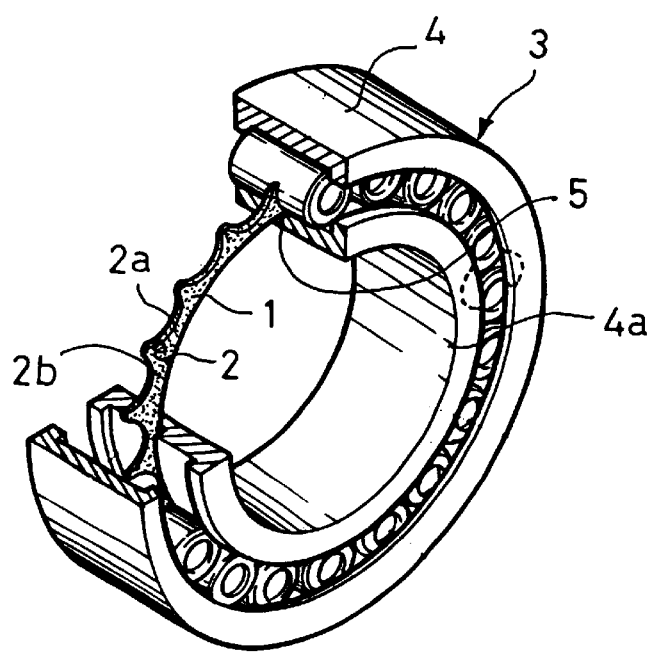
FIG. 8 illustrates the joint type disc cage which has been installed on the inner race according to the present invention.

Further as shown in FIG. 8, in the case where the disc cage 1 is installed into an annular installing groove 5 of the inner race 4a of the roller bearing 3, the sheared disc cage 1 is spread to expand the inside diameter of the disc cage 1. Then the disc cage is fitted into the annular installing groove 5 of the inner race 4a of the roller bearing 3, and then, the joint end portions 2a and 2b are engagedly fitted together, thereby making the disc cage completely circular. In this manner, the rollers can be inserted into the respective roller accommodating slots 1a of the disc cage to maintain them at uniform intervals. Further, the rollers are retained by the outer and inner races 4 and 4a, and therefore, the disc cage 1 will not depart from the annular installing groove 5. Further, when the roller bearing revolves under a heavy load, even if vibrations occur or even if external impacts are imposed, the projected part b and the recessed part b' of the joint end portions 2a and 2b are firmly coupled together without leaving any gap between them. Therefore, the disc cage 1 does not make any loose movements in the lateral or radial direction. Thus the disc cage retains the rollers at uniform intervals, and ensures a smooth rolling of the rollers like a non-sheared disc cage.

EXAMPLE 2

Figure 3:
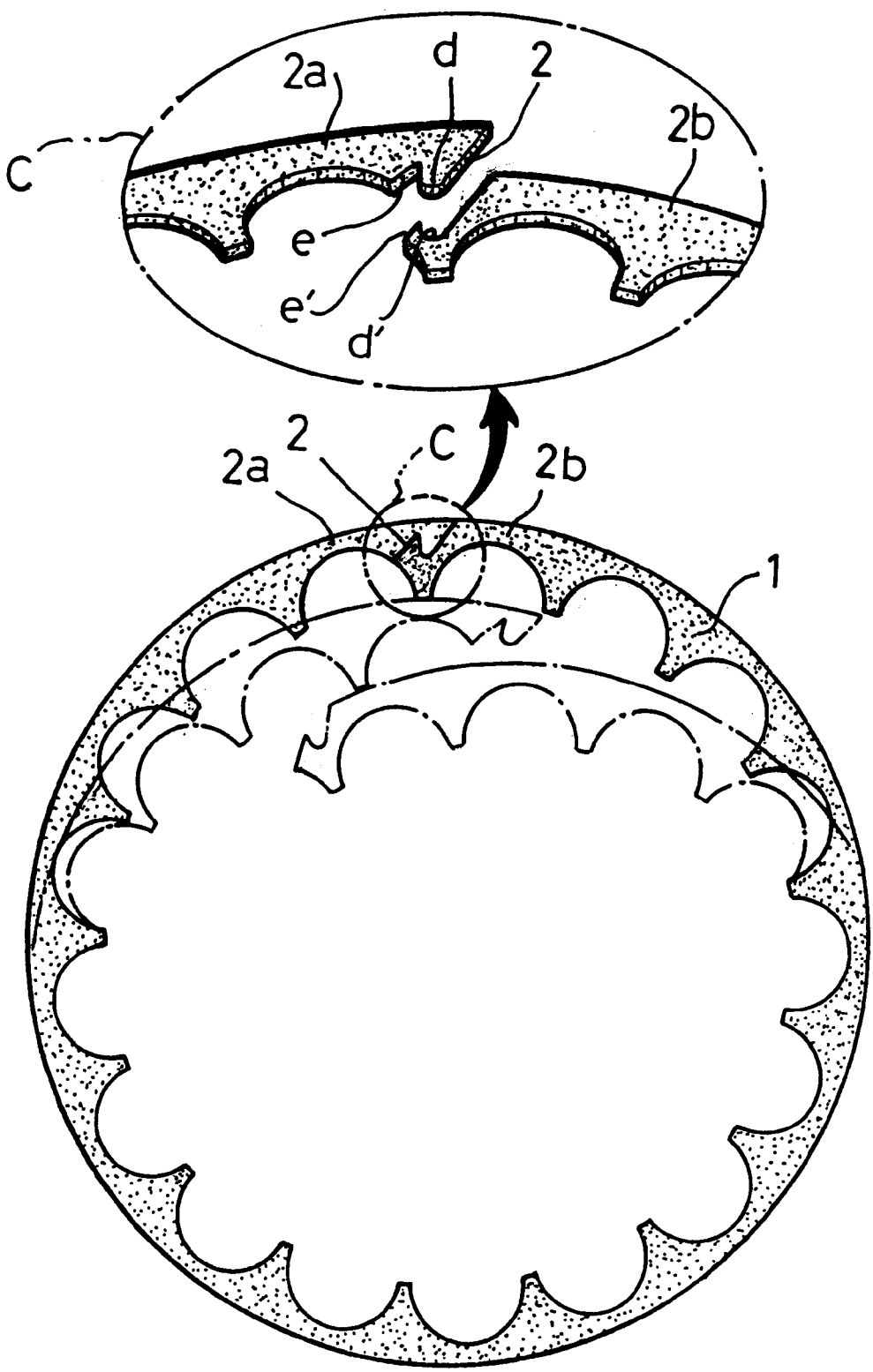
FIG. 3 is a side view of the N joint type disc cage to be installed on an outer race according to the present invention.
Figure 4:
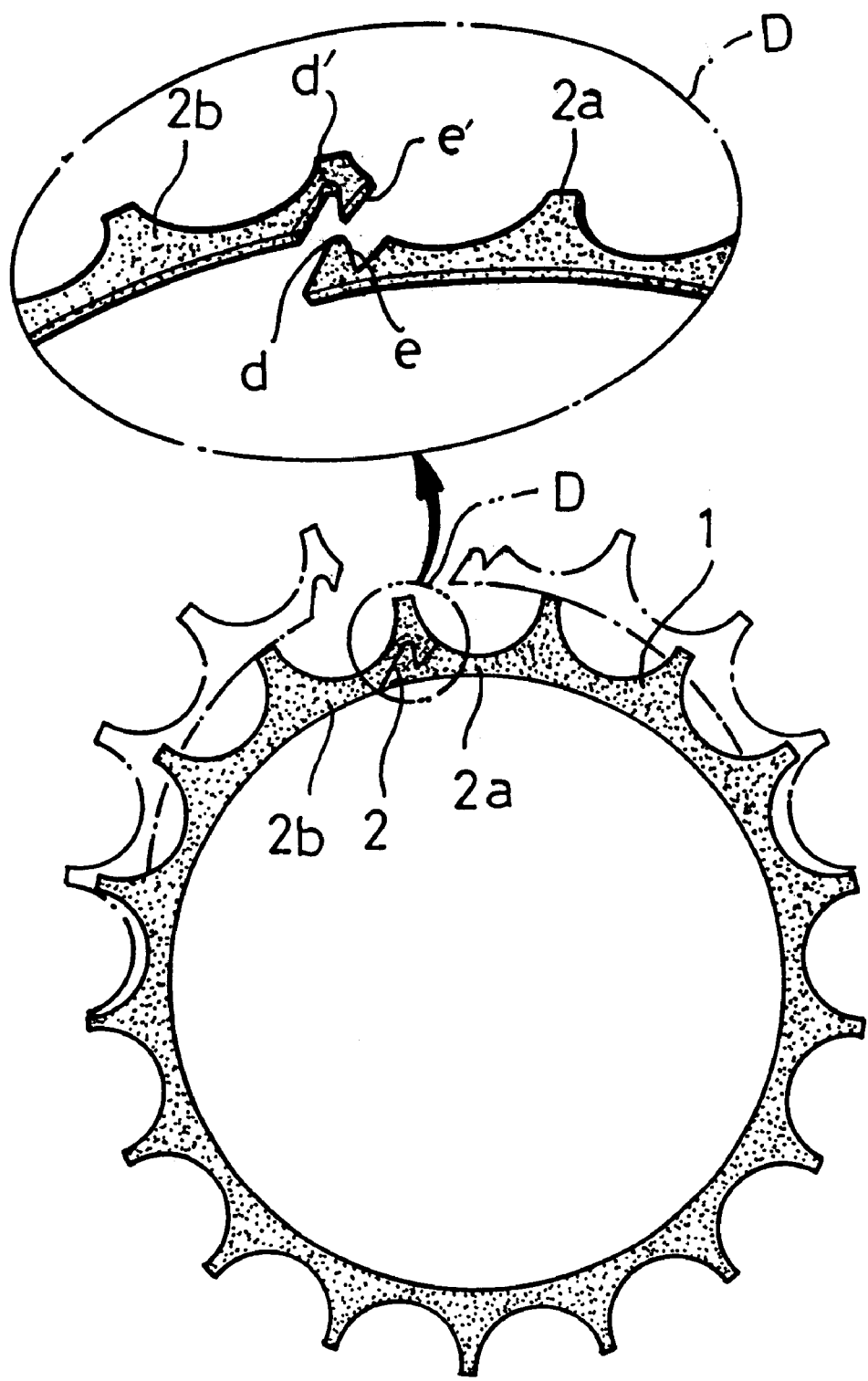
FIG. 4 is a side view of the N joint type disc cage to be installed on an inner race according to the present invention.

FIGS. 3 and 4 are side views of the N joint type disc cage to be installed on an outer or inner race according to the present invention.

In order to install a circular disc cage 1 into an annular installing groove 5 of a single-pieced inner or outer race 4a or 4 of a roller bearing 3, the disc cage 1 is sheared into a C shape. A portion of the sheared part 2, i.e., a joint end portion 2a has a Λ shaped projected part d and a V shaped recessed part e so as to form an N shape. Another joint end portion 2b of the sheared part 2 has a V shaped recess part d' and a Λ shaped projected part e'.

The method of installing the disc cage 1 into the annular installing groove 5 of the outer or inner race 4 or 4a of the roller bearing 3 is same as described in Example 1.

The projected parts d and e' and the recessed parts d' and e of the joint end portions 2a and 2b of the disc cage 1 are firmly engagedly coupled together. When the roller bearing revolves under a heavy load, even if vibrations occur or even if external impacts are imposed, the projected part d and the recessed part d' of the joint end portions 2a and 2b are firmly coupled together without leaving any gap between them. Therefore, the disc cage 1 does not make any loose movements in the lateral or radial direction. Thus the disc cage retains the rollers at uniform intervals, and ensures a smooth rolling of the rollers like a non-sheared disc cage.

EXAMPLE 3

Figure 5:
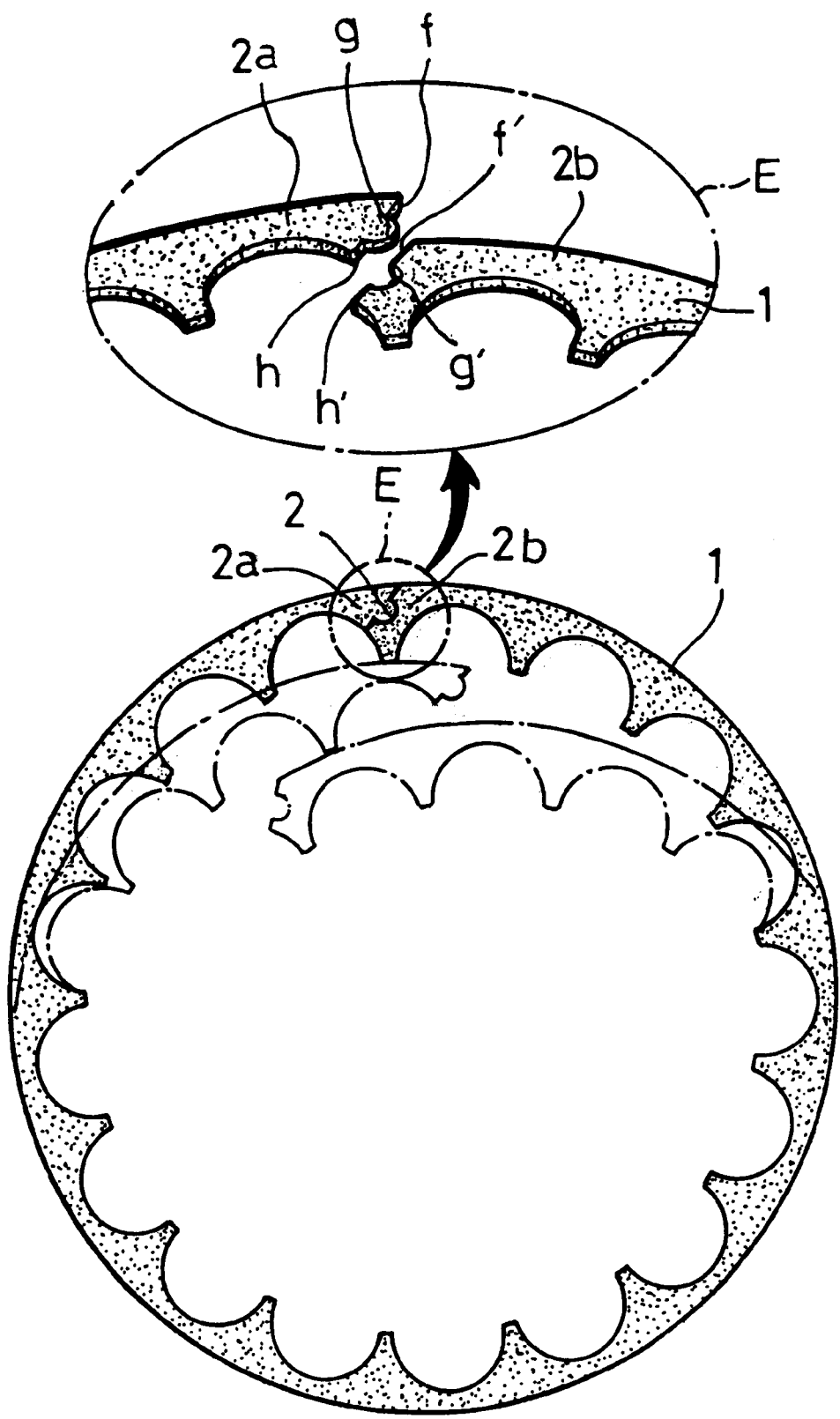
FIG. 5 is a side view of the Q joint type disc cage to be installed on an outer race according to the present invention.
Figure 6:
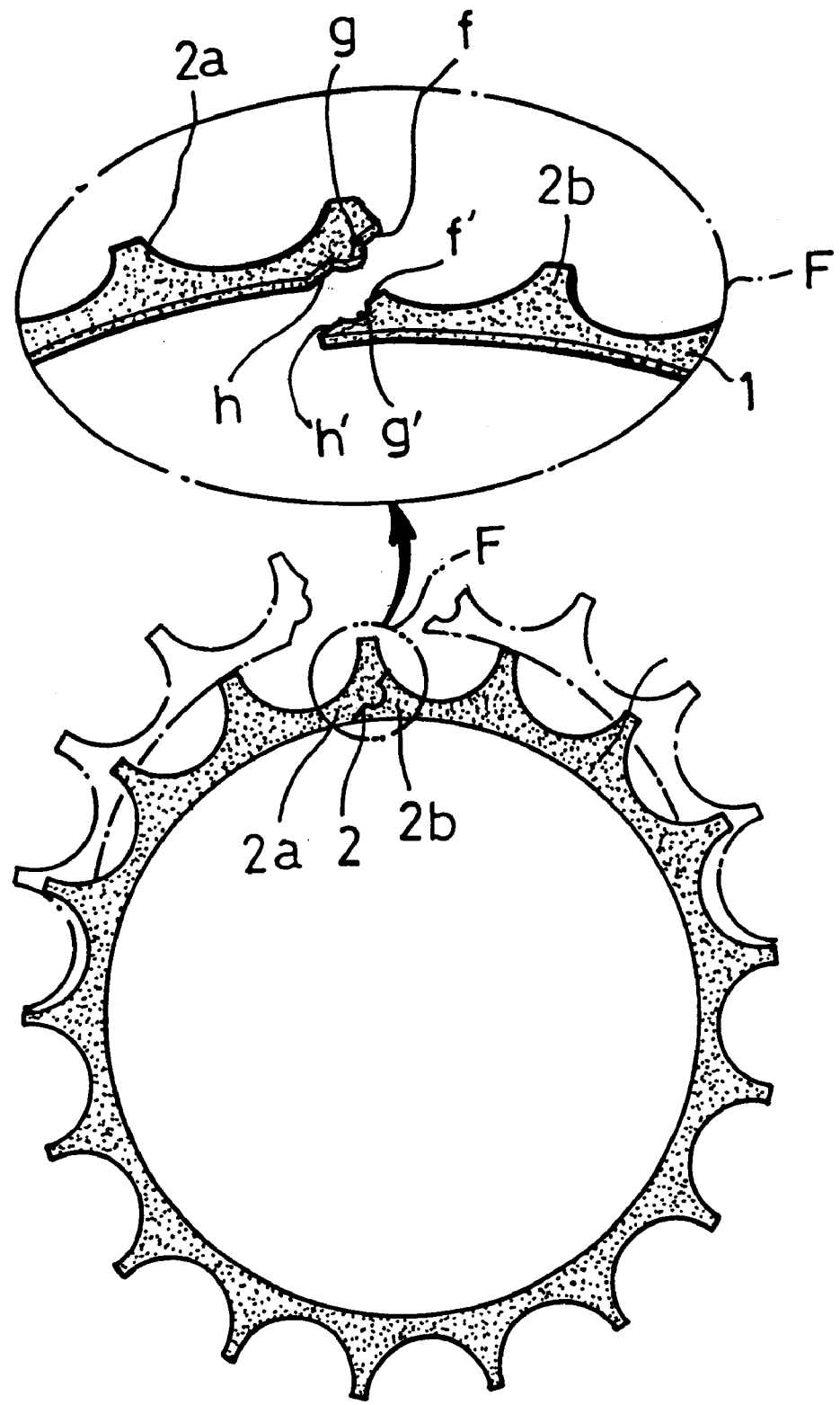
FIG. 6 is a side view of the Q joint type disc cage to be installed on an inner race according to the present invention.

FIGS. 5 and 6 are side views of the Q joint type disc cage to be installed on an outer or inner race according to the present invention.

In order to install a circular disc cage 1 into an annular installing groove 5 of a single-pieced inner or outer race 4a or 4 of a roller bearing 3, the disc cage 1 is sheared into a C shape. A joint end portion 2a of a sheared part 2 of the disc cage 1 includes: a shoulder part f inclined at 40–45 degrees; a projected part g; and a shoulder part h, so as to form a Q shape. Another joint end portion 2b of the sheared part 2 of the disc cage 1 includes: an inclined shoulder part f'; a recessed part g'; and an inclined shoulder part h', so as to form a Q shape.

The method of installing the disc cage 1 into the annular installing groove 5 of outer or inner race 4 or 4a of the roller bearing 3 is same as described in EXAMPLE 1.

If the joint end portions 2a and 2b of the disc cage 1 are coupled together, the inclined shoulder parts f and f', and h and h'are contacted together, and the projected part g and the recessed part g'are firmly engagedly coupled together. When the roller bearing revolves under a heavy load, even if vibrations occur or even if external impacts are imposed, the projected part g and the recessed part g'of the joint end portions 2a and 2b are firmly coupled together without leaving any gap between them. Therefore, the disc cage 1 does not make any loose movements in the lateral or radial direction. Thus the disc cage retains the rollers at uniform intervals, and ensures a smooth rolling of the rollers like a non-sheared disc cage.

EXAMPLE 4

Figure 10:
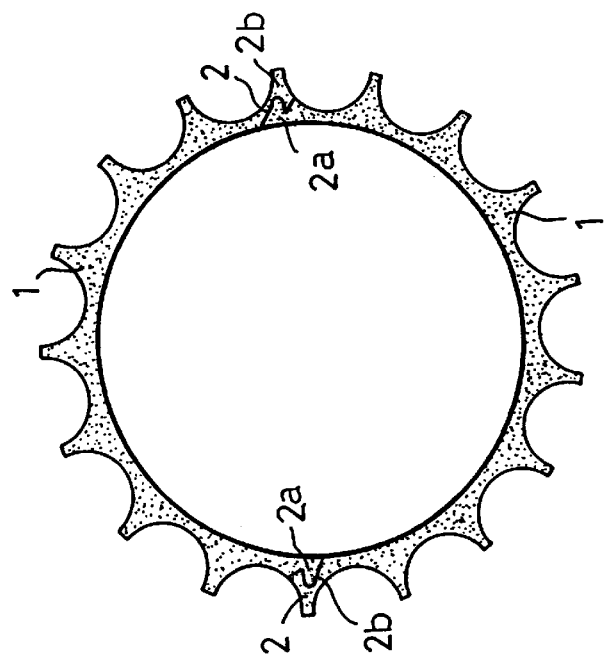
FIG. 10 is a side view of the disc cage of the present invention to be installed on an inner race, in which the shearing is made at two places.
Figure 9:
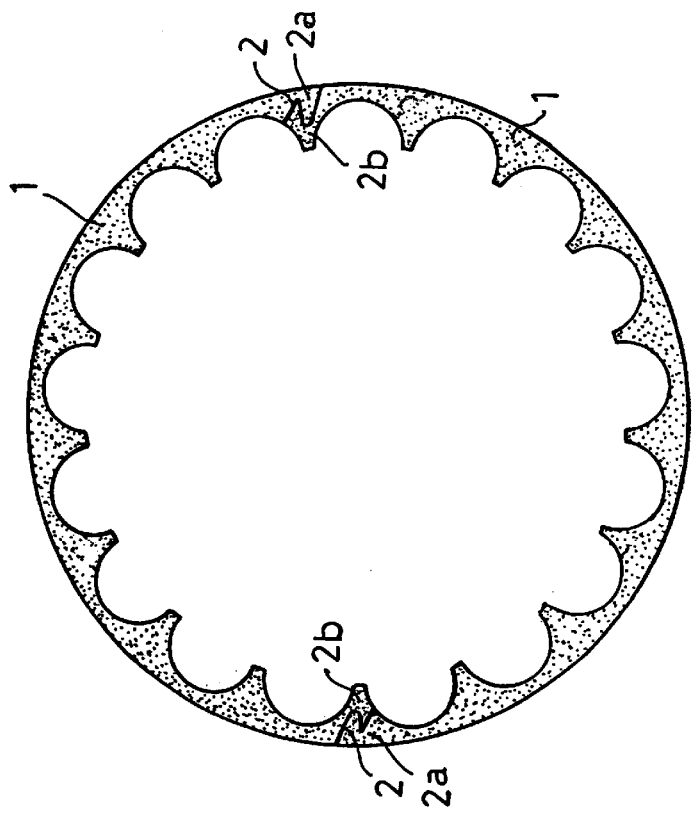
FIG. 9 is a side view of the disc cage of the present invention to be installed on an outer race, in which the shearing is made at two places.

FIGS. 9 and 10 are side views of the disc cage of the present invention to be installed on a single-pieced outer and inner races, in which the disc cage is sheared at two places.

In order to install a circular disc cage 1 into an annular installing groove 5 of a single-pieced inner or outer race 4a or 4 of a roller bearing 3, the disc cage 1 is sheared at two places to divide them into two pieces. The joint end portions 2a and 2b of the sheared parts 2 form an N shape respectively.

In the drawings, the sheared parts 2 form N joint types, but a J joint type and a Q joint type may also be adopted.

When the disc cage 1 is installed into an annular installing groove 5 of the outer or inner race 4 or 4a of the roller bearing 3, first the one half piece of the divided disc cage 1 is installed into the annular installing groove 5, and then, the other half piece of the divided disc cage 1 is installed into the annular installing groove 5 by engagedly fitting the joint end portions 2a and 2b of the divided disc cage 1.

Although this disc cage 1 is divided into two pieces, the joint end portions 2a and 2b of the sheared parts 2 of the disc cage 1 are firmly coupled together, and therefore, the coupled disc cage 1 functions like a single pieced disc cage.

In the above, the present invention was described based on the specific preferred embodiments and the attached drawings, but it should be apparent to those ordinarily skilled in the art that various changes and modifications can be added without departing from the spirit and scope of the present invention, which are defined in the appended claims.

According to the present invention as described above, in order to install a circular disc cage into an annular installing groove of a single-pieced inner or outer race of a roller bearing, the disc cage is sheared into a C shape. A joint means is provided at the sheared part to form joint end portions, and the joint end portions are physically firmly coupled together. Therefore, the sheared disc cage functions like a non-sheared disc cage.

In this manner, the sheared disc cage is restored to the perfectly circular contour which had been maintained before shearing it. Thus when the roller bearing revolves under a heavy load, there exists no gap at the sheared part of the disc cage, but the sheared end portions are firmly engagedly coupled together, and therefore, any loose movements do not occur in the lateral or radial direction.

Therefore, there will be no apprehension that corrosion, deformation, abrasion and degradation may occur. Further, the disc cage can perfectly carry out the function of maintaining the rollers at uniform intervals, and the function of lubricating the rollers. Further, the durability and safety of the roller bearing can be improved compared with the conventional simple C shaped shearing of the disc cage.

What is claimed is:

1. A joint disc cage of a roller bearing, the disc cage being circular and being sheared so as to install it into an annular installing groove of an inner or outer race of the roller bearing, comprising:

joint end portions of a sheared part of the disc cage, for serving a function of a joint by being firmly engaged together without being loosely moved to left or right or in a radial direction, wherein said joint end portions of said sheared part of said disc cage form an asymmetric joint structure.

2. A joint disc cage of a roller bearing, the disc cage being circular and being sheared so as to install it into an annular installing groove of an inner or outer race of the roller bearing, comprising:

joint end portions of a sheared part of the disc cage, for serving a function of a joint by being firmly engaged together without being loosely moved to left or right or in a radial direction, wherein said joint end portions of said sheared part of said disc cage form a J-shaped joint structure.

3. A joint disc cage of a roller bearing, the disc cage being circular and being sheared so as to install it into an annular installing groove of an inner or outer race of the roller bearing, comprising:

joint end portions of a sheared part of the disc cage, for serving a function of a joint by being firmly engaged together without being loosely moved to left or right or in a radial direction, wherein said joint end portions of said sheared part of said disc cage form an N-shaped joint structure.

4. A joint disc cage of a roller bearing, the disc cage being circular and being sheared so as to install it into an annular installing groove of an inner or outer race of the roller bearing, comprising:

joint end portions of a sheared part of the disc cage, for serving a function of a joint by being firmly engaged together without being loosely moved to left or right or in a radial direction, wherein said joint end portions of said sheared part of said disc cage form a Q-shaped joint structure.

* * * * *